US012711237B2

(12) United States Patent
Chen et al.

(10) Patent No.: US 12,711,237 B2
(45) Date of Patent: Aug. 18, 2026

(54) DEVICE PROTECTION USING SOFTWARE UPDATE SECURITY SCORES TO MITIGATE SOFTWARE VULNERABILITIES

(71) Applicant: Dell Products L.P., Round Rock, TX (US)

(72) Inventors: WeiTa Chen, Pflugerville, TX (US); Anshul Gandhi, Austin, TX (US); Randi Renae Ludwig, Round Rock, TX (US); Jacob Hummel, Salt Lake City, UT (US)

(73) Assignee: Dell Products L.P., Round Rock, TX (US)

( * ) Notice: Subject to any disclaimer, the term of this patent is extended or adjusted under 35 U.S.C. 154(b) by 226 days.

(21) Appl. No.: 18/142,335

(22) Filed: May 2, 2023

(65) Prior Publication Data

US 2024/0370568 A1 Nov. 7, 2024

(51) Int. Cl.

| | |
|---|---|
| ***G06F 21/57*** | (2013.01) |
| ***G06F 8/65*** | (2018.01) |
| ***G06F 21/55*** | (2013.01) |

(52) U.S. Cl.

CPC .............. *G06F 21/577* (2013.01); *G06F 8/65* (2013.01); *G06F 21/554* (2013.01); *G06F 21/572* (2013.01); *G06F 2221/033* (2013.01)

(58) Field of Classification Search

None

See application file for complete search history.

(56) References Cited

U.S. PATENT DOCUMENTS

| | | | | |
|---|---|---|---|---|
| 8,819,655 | B1 * | 8/2014 | Hopwood | G06F 8/658 717/174 |
| 2014/0189873 | A1 * | 7/2014 | Elder | H04L 63/1433 726/25 |
| 2019/0238584 | A1 * | 8/2019 | Somasundaram | H04L 63/20 |
| 2020/0117808 | A1 * | 4/2020 | Neystadt | G06F 21/562 |

(Continued)

OTHER PUBLICATIONS

"Smart Technology that Powers your Support Experience"; https://www.dell.com/en-us/shop/supportassistforpcs/cp/supportassistforpcs; downloaded on May 1, 2023.

(Continued)

*Primary Examiner* — Syed A Roni

(74) *Attorney, Agent, or Firm* — Ryan, Mason & Lewis, LLP

(57) ABSTRACT

Techniques are provided for device protection using software update security scores to mitigate software vulnerabilities. One method comprises obtaining an indication of available software updates for a device; evaluating a security vulnerability of one or more uninstalled software updates of the available software updates for the device; determining a security score for the device based on the security vulnerability of the one or more uninstalled software updates of the available software updates for the device; and initiating an automated action using the security score for the device and/or the one or more security vulnerabilities of the one or more uninstalled software updates. The uninstalled software updates and/or the available software updates may be ranked using respective software update security scores. The security score for the device may be determined by aggregating security scores of the one or more uninstalled software updates.

20 Claims, 11 Drawing Sheets

(56) References Cited

U.S. PATENT DOCUMENTS

2021/0216643 A1* 7/2021 Mishra .................... G06F 8/61
2022/0179639 A1* 6/2022 Manley ............... G06F 11/3688
2023/0237159 A1* 7/2023 Sethi ...................... G06F 21/57
726/25
2023/0237160 A1* 7/2023 Sethi .................... G06F 21/577
726/23

OTHER PUBLICATIONS

U.S. Appl. No. 17/564,698 entitled, "Automated Firmware Updates Based on Device Driver Version in a Server Device"; filed Dec. 29, 2021.
U.S. Appl. No. 18/121,910 entitled, "Controlling Installation of Drivers Based on Hardware and Software Components Present on Information Technology Assets"; filed Mar. 15, 2023.

* cited by examiner

SOFTWARE UPDATE INFORMATION

| | |
|---|---|
| DRIVER IDENTIFIER: | MKV9Y |
| UPDATE DESCRIPTION: | UPDATE OF MANUFACTURER X SYSTEM BIOS |
| FIXES/ENHANCEMENTS: | FIRMWARE UPDATES TO ADDRESS CVE-2023-53XY |
| VERSION: | VERSION A1N |
| CATEGORY: | BIOS |
| RELEASE DATE: | APRIL 19, 2023 |
| IMPORTANCE: | URGENT; CONTAINS CRITICAL BUG FIXES AND CHANGES TO IMPROVE DEVICE FUNCTIONALITY, RELIABILITY, AND STABILITY; MAY INCLUDE SECURITY FIXES |

FIG. 6

CVE-2023-53XY DETAIL

| | |
|---|---|
| VULNERABILITY DESCRIPTION: | OUT-OF-BOUNDS READ VULNERABILITY |
| RISK: | DISCLOSURE OF INFORMATION |
| BASE SCORE: | 3.3 (LOW CLASSIFICATION) |
| COMMON WEAKNESS ENUMERATION (CWE): | CWE-125 (OUT-OF-BOUNDS READ) |
| VULNERABILITY DATABASE PUBLICATION DATE: | APRIL 24, 2023 |
| ADVISORY LINK(S): | |

HTTPS://HELP.MFRX.COM/SECURITY/PRODUCTS/BIOS21-18.HTML

| DRIVER IDENTIFIER | NAME | NUMBER OF CVEs | SECURITY SCORE | SECURITY SEVERITY |
|---|---|---|---|---|
| JX83N | PRODUCT X SYSTEM BIOS | 1 | 9.8 | CRITICAL |
| WX5Y7 | PRODUCT Y SYSTEM BIOS | 9 | 7.8 | HIGH |
| D04NN | MANUFACTURER 123 GRAPHICS DRIVER | 19 | 8.2 | HIGH |
| ... | ... | ... | ... | ... |
| 662HW | MANUFACTURER XYZ STORAGE TECHNOLOGY ENTERPRISE DRIVER | 0 | 0 | NONE |

FIG. 8

DEVICE PROTECTION USING SOFTWARE UPDATE SECURITY SCORES TO MITIGATE SOFTWARE VULNERABILITIES

FIELD

The field relates generally to information processing systems, and more particularly to the protection of devices in such information processing systems.

BACKGROUND

Software applications and other software installed on computing devices are often updated by the providers of such software. When a software update becomes available for a particular software application (or other software) installed on a given computing device, it is often difficult to assess the importance of installing the software update.

SUMMARY

In one embodiment, a method comprises obtaining an indication of one or more available software updates for at least one device; evaluating one or more security vulnerabilities of at least one or more uninstalled software updates of the one or more available software updates for the at least one device; determining a security score for the at least one device based at least in part on the one or more security vulnerabilities of the one or more uninstalled software updates of the one or more available software updates for the at least one device; and initiating at least one automated action using one or more of the security score for the at least one device and the one or more security vulnerabilities of the one or more uninstalled software updates.

In some embodiments, the evaluating the one or more security vulnerabilities of a given one of the one or more uninstalled software updates comprises extracting the one or more security vulnerabilities from the given uninstalled software update using pattern matching; determining a respective security score for the one or more extracted security vulnerabilities; and determining an overall security score for the given uninstalled software update based at least in part on the security scores for the one or more extracted security vulnerabilities. The pattern matching may employ one or more regular expressions to extract data indicative of a security vulnerability from a description of the given uninstalled software update. The security score for a given security vulnerability may be determined by obtaining security information from a vulnerability database.

In one or more embodiments, (i) the one or more uninstalled software updates and/or (ii) the one or more available software updates may be ranked using one or more respective software update security scores. The determining the security score for the at least one device may comprise determining an aggregate security score of the one or more uninstalled software updates.

In one or more embodiments, the at least one automated action using the security score for the at least one device may comprise one or more of generating a notification indicating a respective security score of the at least one of the one or more uninstalled software updates; and installing the at least one of the one or more uninstalled software updates.

Other illustrative embodiments include, without limitation, apparatus, systems, methods and computer program products comprising processor-readable storage media.

BRIEF DESCRIPTION OF THE DRAWINGS

FIG. 6 illustrates information maintained for a given software update in an illustrative embodiment;

FIG. 7 illustrates information maintained for a given security vulnerability in an illustrative embodiment;

FIG. 8 is a sample table illustrating information maintained for available software updates in an illustrative embodiment;

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for device protection using software update security scores to mitigate software vulnerabilities.

As noted above, when a software update becomes available for a particular software application (or other software) installed on a given computing device, it is often difficult to assess the importance of installing the software update. For example, it is often difficult to identify those software updates that address one or more security vulnerabilities. Meanwhile, many malicious actors exploit such software vulnerabilities. To mitigate such exposure, software updates with security patches are often provided to address existing security vulnerabilities.

In one or more embodiments, software update security vulnerability protection techniques are provided to identify software updates having security patches and to assign a security score for each software update based at least in part on a security severity (e.g., to proactively identify software updates having one or more security vulnerabilities). The security scores are used to prioritize the available software updates and to generate a device security score based on a security severity of the uninstalled software updates (e.g., when users cannot or do not install all of the available software updates). The security scores assigned to software updates and/or a given device may comprise, for example, an alphanumeric value and/or a security classification. One or more automated actions may be performed based on the device security score and/or the security scores assigned to one or more of the software updates.

Figure 1:
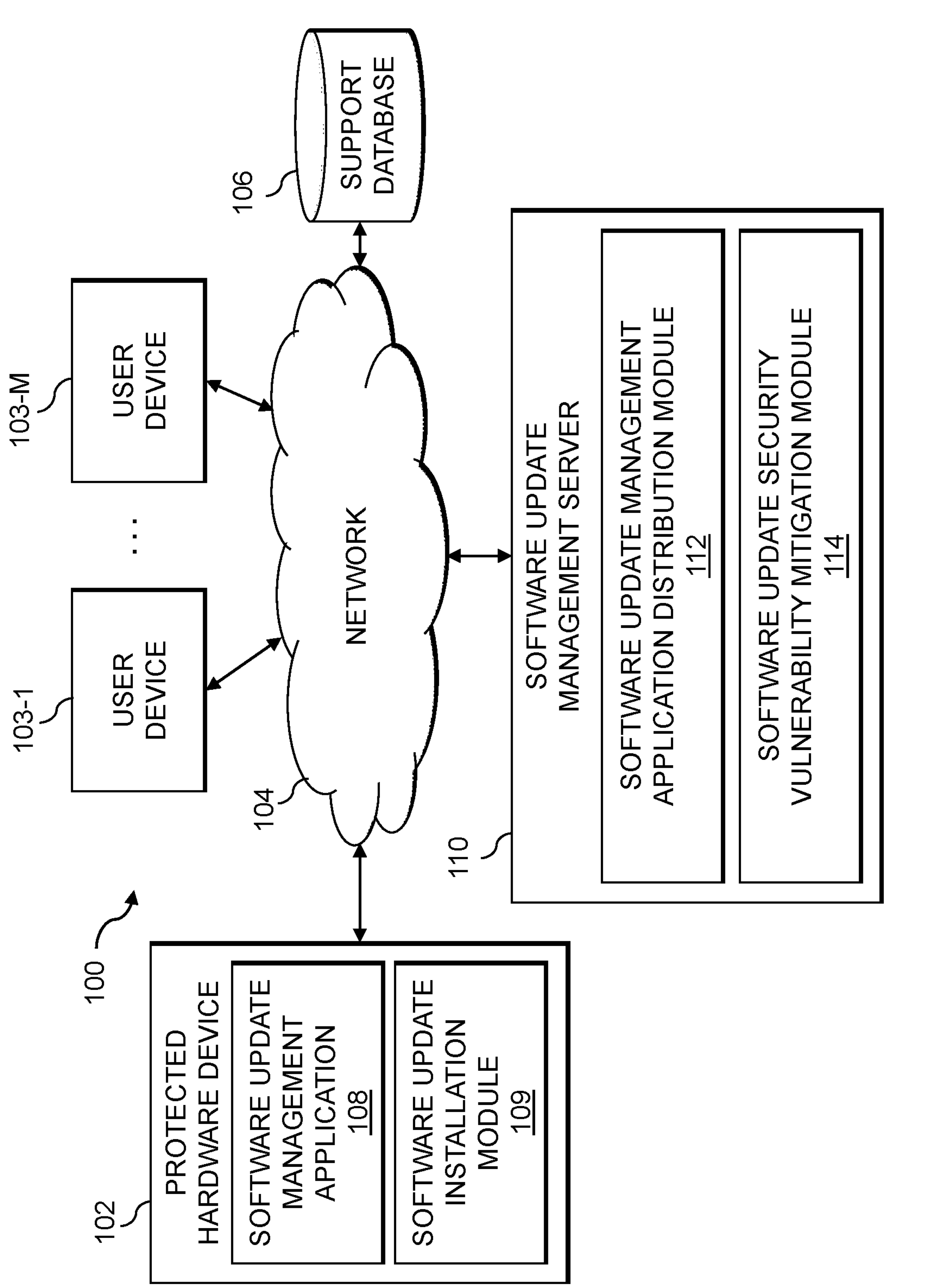
FIG. 1 illustrates an information processing system configured for device protection using software update security scores to mitigate software vulnerabilities in an illustrative embodiment.

FIG. 1 shows a computer network (also referred to herein as an information processing system) 100 configured in an illustrative embodiment. The computer network 100 comprises a plurality of user devices 103-1 through 103-M, collectively referred to herein as user devices 103. The user devices 103 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 are one or more protected hardware devices 102, one or more software update management servers 110 and one or more support databases 106, discussed below.

The protected hardware devices 102 and user devices 103 may comprise, for example, physical computing devices such as host devices, edge devices and/or other devices such as mobile telephones, laptop computers, tablet computers, desktop computers, Internet of things (IoT) devices, or other types of computing devices. Such devices are examples of what are more generally referred to herein as "processing devices" which may be protected using the disclosed device protection techniques. Some of these processing devices are also generally referred to herein as "computers." The protected hardware devices 102 and user devices 103 may comprise a network client that includes networking capabilities such as ethernet, Wi-Fi, etc. When the user devices 103, for example, are implemented as host devices, the host devices may illustratively comprise servers or other types of computers of an enterprise computer system, cloud-based computer system or other arrangement of multiple compute nodes associated with respective users.

For example, the host devices in some embodiments illustratively provide compute services such as execution of one or more applications on behalf of each of one or more users associated with respective ones of the host devices.

The user devices 103 in some embodiments comprise respective processing devices associated with a particular company, organization or other enterprise or group of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

It is to be appreciated that the term "user" in this context and elsewhere herein is intended to be broadly construed so as to encompass, for example, human, hardware, software or firmware entities (including services), as well as various combinations of such entities. Compute and/or storage services may be provided for users under a Platform-as-a-Service (PaaS) model, a Storage-as-a-Service (STaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

As shown in FIG. 1, an exemplary protected hardware device 102 may comprise a software update management application 108 and a software update installation module 109. In some embodiments, the software update management application 108 provides client-side functionality associated with the software update management server 110, as discussed further below in conjunction with FIGS. 3 through 5, for example. In some embodiments, the software update management application 108 provides a device identifier of the respective protected hardware device 102 to the software update management server 110 and determines which available software updates are installed on the respective protected hardware device 102. The software update installation module 109 is configured to install a given software update on the protected hardware device 102, for example, when initiated by a user of the protected hardware device 102 or by the software update management server 110. Software updates may be managed through support software, such as Dell SupportAssist. Such support software may be responsible for scheduling and/or monitoring software updates for the protected hardware device 102 and/or providing software update catalogs for software, such as BIOS, device drivers, firmware and software applications. The support software may optionally validate one or more software updates and/or ban one or more software updates that have been identified as comprising a security or operational risk.

It is to be appreciated that this particular arrangement of elements 108 and 109 illustrated in the protected hardware device 102 of the FIG. 1 embodiment is presented by way of example only, and alternative arrangements can be used in other embodiments. For example, the functionality associated with elements 108 and 109 in other embodiments can be combined into a single element, or separated across a larger number of elements. As another example, multiple distinct processors can be used to implement different ones of elements 108 and 109, or portions thereof.

At least portions of the software update management application 108 and the software update installation module 109 may be implemented at least in part in the form of software that is stored in memory and executed by a processor. An exemplary process utilizing the software update management application 108 of the protected hardware device 102 in computer network 100 will be described in more detail with reference to FIGS. 4 and 5, for example.

Other protected hardware devices 102 (not shown in FIG. 1), as well as protected versions of user devices 103, are assumed to be configured in a manner similar to that shown for protected hardware device 102 in the figure.

As shown in FIG. 1, an exemplary software update management server 110 may comprise a software update management application distribution module 112 and a software update security vulnerability mitigation module 114. In some embodiments, the software update management application distribution module 112 distributes the software update management application 108 to protected hardware devices 102, as discussed further below in conjunction with FIGS. 3 through 5, for example. In the example of FIG. 1, the software update security vulnerability mitigation module 114 implements the server-side functionality associated with the disclosed techniques for software update security vulnerability protection. For example, when the software update management application 108 provides the device identifier of the respective protected hardware device 102 to the software update management server 110, the software update security vulnerability mitigation module 114 will determine the available software updates that are applicable to the particular device (e.g., the most recent updates of each software item the particular device, as software updates are often cumulative and also include prior updates). For example, the software update security vulnerability mitigation module 114 may scan a given protected hardware device 102 or user device 103 to determine if there are available software updates for software associated with the particular device. In addition, when the software update management application 108 identifies the available software updates that are installed on the respective protected hardware device 102, the software update security vulnerability mitigation module 114 will calculate a device score based on the uninstalled software updates, as discussed further below.

It is to be appreciated that this particular arrangement of modules 112 and 114 illustrated in the software update management server 110 of the FIG. 1 embodiment is presented by way of example only, and alternative arrangements can be used in other embodiments. For example, the functionality associated with modules 112 and 114 in other embodiments can be combined into a single element, or separated across a larger number of elements. As another example, multiple distinct processors can be used to implement different ones of modules 112 and 114, or portions thereof.

At least portions of modules 112 and 114 may be implemented at least in part in the form of software that is stored in memory and executed by a processor. An exemplary process utilizing modules 112 and 114 of the software update management server 110 in computer network 100 will be described in more detail with reference to FIGS. 4 and 5, for example.

The software update management server 110 may be implemented, for example, on the cloud, such as a private cloud, or on the premises of an enterprise or another entity. In some embodiments, the software update management server 110, or portions thereof, may be implemented as part of a host device. The software update management server 110 may implement server-side functionality associated with the disclosed software update security vulnerability protection techniques, such as, for example, distributing the software update management application 108 to protected hardware devices 102, implementing policies for detecting software update security vulnerabilities. With the disclosed software update security vulnerability protection techniques, in at least some embodiments, the software update management server 110 identifies available software updates, assesses security vulnerabilities associated with such available software updates, provides a ranked list of at least some uninstalled software updates and provides a device score assessing the security vulnerability of a given protected hardware device 102 resulting from uninstalled software updates.

Additionally, the protected hardware device 102 and/or the software update management server 110 can have an associated support database 106 configured to store, for example, information that is utilized by the software update management server 110 and/or the software update management application 108 for performing the disclosed software update security vulnerability mitigation techniques. The stored information may be related to one or more devices, such as one or more protected hardware devices 102 and/or one or more user devices 103, such as device locations, network address assignments and software status information (e.g., latest installed version). In addition, the stored information may comprise additional software update information, such as the latest available software updates, and information related to such available software updates. Portions of a national vulnerability database (NVD), for example, the NVD database provided by the National Institute of Standards and Technology, US Department of Commerce, may be stored in the support database 106 and/or be accessed from a central or distributed repository.

The support database 106 may be maintained, for example, by the software update management server 110 and accessible by one or more protected hardware devices 102.

The support database 106 in the present embodiment is implemented using one or more storage systems associated with the software update management server 110. Such storage systems can comprise any of a variety of different types of storage such as, network-attached storage (NAS), storage area networks (SANs), direct-attached storage (DAS) and distributed DAS, as well as combinations of these and other storage types, including software-defined storage.

The one or more protected hardware devices 102, user devices 103 and/or software update management servers 110 may be implemented on a common processing platform, or on separate processing platforms. The one or more protected hardware devices 102 and user devices 103 may be configured to interact over the network 104 in at least some embodiments with the software update management server 110.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the user devices 103 and the storage system to reside in different data centers. Numerous other distributed implementations of the host devices and the storage system are possible.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with the one or more protected hardware devices 102, user devices 103 and/or software update management servers 110 can be one or more input-output devices (not shown), which illustratively comprise keyboards, displays or other types of input-output devices in any combination. Such input-output devices can be used, for example, to support one or more user interfaces to the software update management server 110, as well as to support communication between the software update management server 110 and other related systems and devices not explicitly shown.

The one or more protected hardware devices 102, user devices 103 and/or software update management servers 110 in the FIG. 1 embodiment are assumed to be implemented using at least one processing device. Each such processing device generally comprises at least one processor and an associated memory and implements one or more functional modules for controlling certain features of the respective device.

More particularly, the one or more protected hardware devices 102, user devices 103 and/or software update management servers 110 in this embodiment each can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including SSDs, and should therefore not be viewed as limited in any way to spinning magnetic media.

The network interface allows the one or more protected hardware devices 102, user devices 103 and/or software update management servers 110 to communicate in some embodiments over the network 104 with each other (as well as one or more other networked devices, not shown), and illustratively comprises one or more conventional transceivers.

It is to be understood that the particular set of elements shown in FIG. 1 for device protection using software update security scores to mitigate software vulnerabilities is presented by way of illustrative example only, and in other embodiments additional or alternative elements may be used. Thus, another embodiment includes additional or alternative systems, devices and other network entities, as well as different arrangements of modules and other components.

Figure 2:
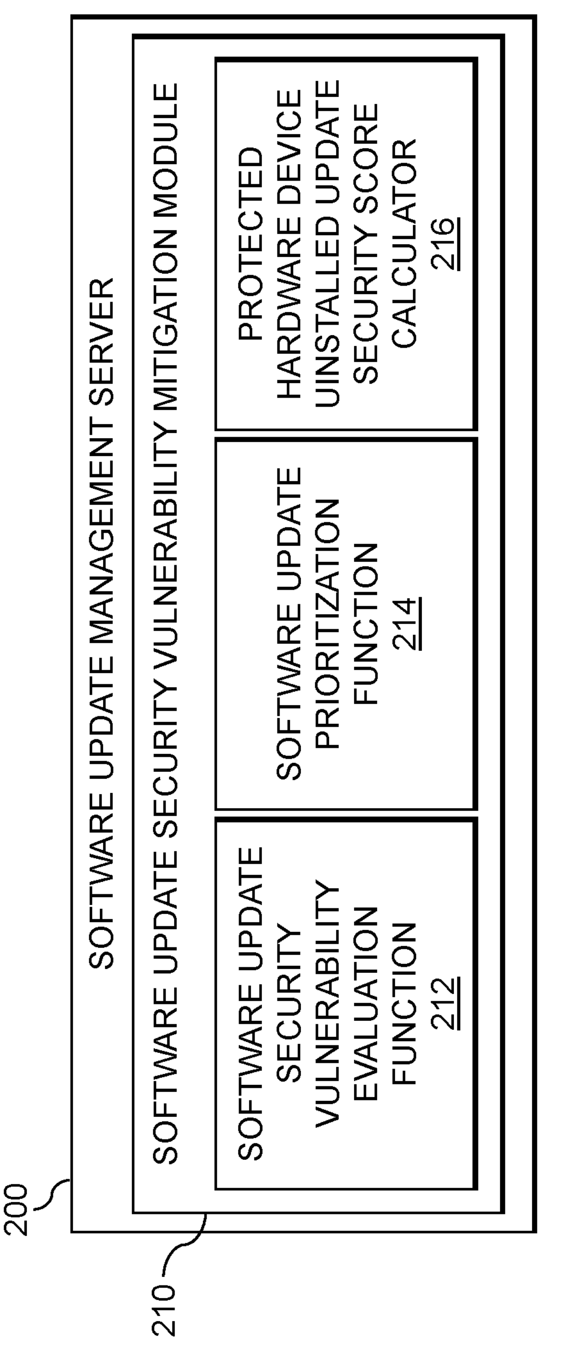
FIG. 2 illustrates a software update management server in an illustrative embodiment.

FIG. 2 illustrates a software update management server 200 in an illustrative embodiment. In the example of FIG. 2, the software update management server 200 comprises a software update security vulnerability mitigation module 210. The software update security vulnerability mitigation module 210 comprises a software update security vulnerability evaluation function 212, a software update prioritization function 214 and a protected hardware device uninstalled update security score calculator 216. In some embodiments, the software update security vulnerability evaluation function 212 identifies available software updates that are applicable to a given protected device (e.g., based at least in part on the device identifier provided by the software update management application 108 of FIG. 1) and evaluates the security vulnerability of each available software update. The software update prioritization function 214 ranks the available and/or uninstalled software updates using software update security scores assigned to such software updates. The protected hardware device uninstalled update security score calculator 216 determines a device score for a given protected device based on the security vulnerability of each uninstalled software update. The software update security vulnerability evaluation function 212, the software update prioritization function 214 and the protected hardware device uninstalled update security score calculator 216 are discussed further below in conjunction with FIGS. 4 through 9, for example.

It is to be appreciated that this particular arrangement of elements 212, 214 and 216 illustrated in the software update security vulnerability mitigation module 210 of the FIG. 2 embodiment is presented by way of example only, and alternative arrangements can be used in other embodiments. For example, the functionality associated with elements 212, 214 and 216 in other embodiments can be combined into a single element, or separated across a larger number of elements. As another example, multiple distinct processors can be used to implement different ones of elements 212, 214 and 216, or portions thereof.

At least portions of elements 212, 214 and 216 may be implemented at least in part in the form of software that is stored in memory and executed by a processor. An exemplary process utilizing elements 210, 212, 214 and 216 of the software update management server 200 will be described in more detail with reference to FIGS. 4 and 5, for example.

Figure 3:
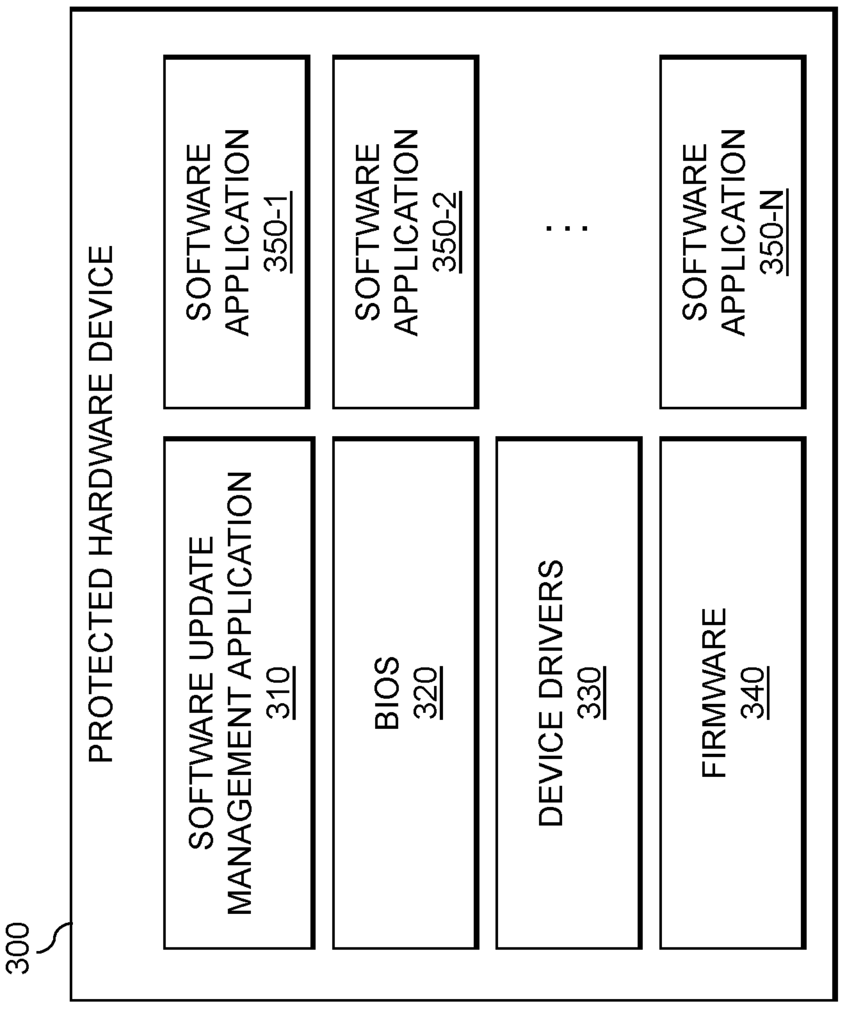
FIG. 3 illustrates a protected hardware device in an illustrative embodiment.

FIG. 3 illustrates a protected hardware device 300 in an illustrative embodiment. In the example of FIG. 3, the protected hardware device 300 comprises a software update management application 310, a basic input/output system (BIOS) 320, one or more device drivers 330, one or more firmware elements 340 and one or more software applications 350-1 through 350-N, collectively referred to as software applications 350. The software update management application 310 may be implemented, for example, in a similar manner as the software update management application 108 of FIG. 1. The BIOS 320 comprises instructions for loading computer hardware elements and booting the operating system. The device drivers 330 comprise a specified set of application programming interfaces (APIs) and other features to communicate with corresponding features in the firmware elements 340 (e.g., to control the hardware devices associated with the protected hardware device 300). The firmware elements 340 comprise software that provides specific instructions to one or more hardware devices associated with the protected hardware device 300. The software applications 350 comprise software installed on the protected hardware device 300, such as Adobe Acrobat application software suite for creating, viewing and managing Portable Document Format (PDF) files; and the Zoom videotelephony application software.

In at least some embodiments, the BIOS 320, device drivers 330, firmware elements 340 and/or software applications 350 are examples of the software that may be maintained using the disclosed software update security vulnerability protection techniques.

Figure 4:
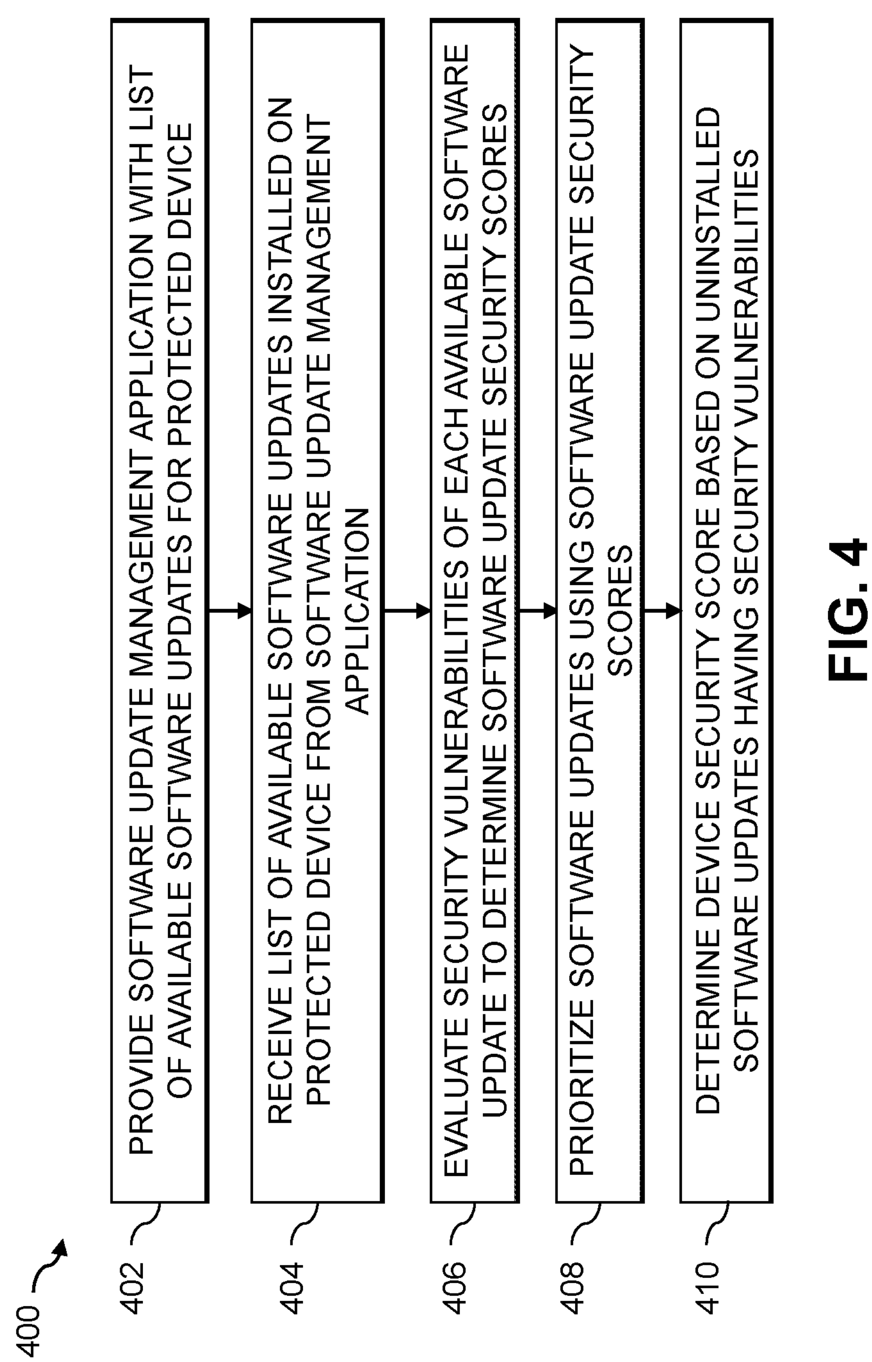
FIG. 4 is a flow chart illustrating an exemplary implementation of a process for device protection using software update security scores to mitigate software vulnerabilities in an illustrative embodiment.

FIG. 4 is a flow chart illustrating an exemplary implementation of a process 400 for device protection using software update security scores to mitigate software vulnerabilities in an illustrative embodiment. In the example of FIG. 4, the process 400 may be performed by the software update security vulnerability mitigation module 114 of the software update management server 110 of FIG. 1. In step 402, the software update management application (e.g., software update management application 108) is provided with a list of available software updates for a given protected device. In step 404, a list of available software updates that are installed on the protected device is received from the software update management application.

In step 406, the security vulnerabilities of each available software update are evaluated, as discussed further below in conjunction with FIG. 5. The security vulnerabilities of a given available software update may be expressed, for example, as a software update security score or as a software update security severity classification, as discussed further below.

The software updates are prioritized in step 408 using the software update security scores. The available software updates and/or the uninstalled software updates may be prioritized. The software updates may be prioritized by ranking the available software updates based on the software update security scores to display a list of software updates, for example, ranked from the most critical software updates to the least critical software updates. In this manner, the ranked software update security scores suggest a recommended installation order of the software updates from a security perspective.

In step 410, a device security score is determined based on the software update security scores of those uninstalled software updates having security vulnerabilities. For example, depending on which security updates are installed and how many security updates are left uninstalled, the process 400 will output a highest security score of the uninstalled security updates as the device security score. A given device could have two uninstalled security updates, for example. If the security score of one uninstalled security update is 7.7 and the security score of the other uninstalled security update is 5.5, then the process will output a device security score of 7.7 for the given device.

In some embodiments, the ranked list of available software updates (with corresponding software update security scores) and/or the device security score may be provided to the software update management application, for example, for a visual presentation on the given hardware device.

Figure 5:
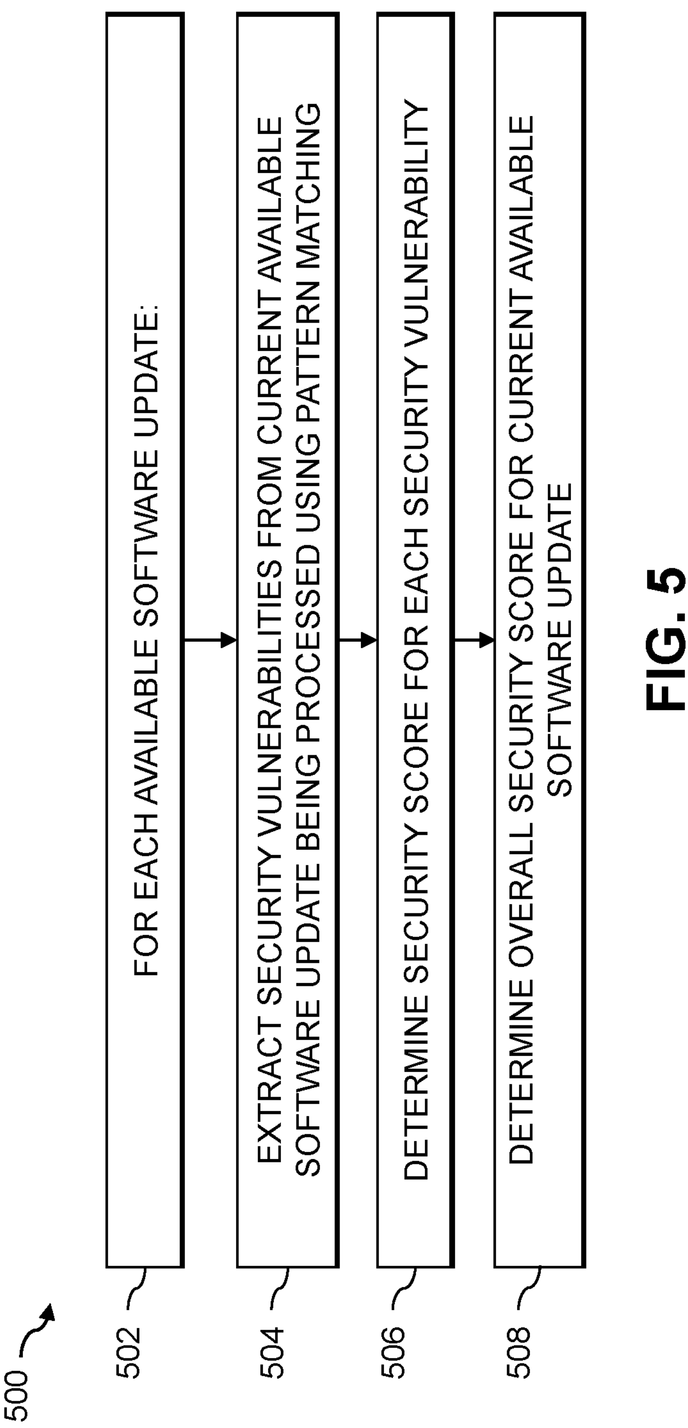
FIG. 5 is a flow chart illustrating an exemplary implementation of a process for evaluating security vulnerabilities of available software updates in an illustrative embodiment.

FIG. 5 is a flow chart illustrating an exemplary implementation of a process 500 for evaluating security vulnerabilities of available software updates in an illustrative embodiment. The process 500 may be performed, for example, by the software update security vulnerability mitigation module 114 of the software update management server 110 of FIG. 1. In step 502, steps 504 through 508 are performed for each available software update. In step 504, security vulnerabilities are extracted from the current available software update being processed using pattern matching techniques, as discussed further below in conjunction with FIG. 6. For example, the information for each available software update can be processed to extract information suggesting that a particular software update comprises one or more security vulnerabilities (e.g., by applying regular expressions to extract security information, such as common vulnerabilities and exposures (CVEs)). In some embodiments, if a given software update comprises at least one associated CVE, then the given software update is considered a security update. The number of CVEs associated with each software update may be counted and provided as additional information for the corresponding software update.

In step 506, a security score is determined for each security vulnerability in the current software update being processed. The security score for each security vulnerability may be determined in some embodiments by accessing the NVD database. Generally, an NVD database provides information on CVEs and their severity. A CVE may identify one or more weaknesses in software code that may be exploited by a malicious actor to access computer systems.

In some embodiments, the security severity of a given CVE is classified into one of the following exemplary software update security severity classifications, based on the security score assigned to the respective CVE in the NVD database:

None: 0.0;
Low: 0.1-3.9;
Medium: 4.0-6.9;
High: 7.0-8.9; or
Critical: 9.0-10.0.

Generally, a higher security score assigned to a given CVE in the NVD database, provides an indication of a more severe security threat of the given CVE. In one or more embodiments, if a given security update has more than one CVE, then a maximum security score of the CVEs associated with the software update may be assigned to the software update. For example, if a given security update has two CVEs, such as one software update with a security score of 6.5 and another software update with a security score of 8, then a security score of 8.6 will be assigned as the security score for the given security update.

In some embodiments, the source of the CVE (e.g., the organization that established the CVE) may be extracted from a CVE, if desired, and provided as additional information for a security update associated with the CVE (e.g., to facilitate special handling for CVEs associated with a given organization). For example, if a given CVE is associated with a third-party vendor, a different treatment of the CVE may be employed (e.g., a lower weight may be assigned to security vulnerabilities associated with software products from such third-party vendors).

The overall security score for the current available software update being processed is determined in step 508 (e.g., a maximum security score of the CVEs associated with the current available software update may be assigned as the overall security score for the current available software update, as discussed above). In other embodiments, other techniques may be employed to determine the overall security score for the current available software update being processed, such as an average, mean or other aggregation of the security scores of the CVEs associated with the current available software update.

FIG. 6 illustrates information maintained for a given software update in an illustrative embodiment. In the example of FIG. 6, the given software update is identified by a driver identifier. The information maintained for the given software update may include a description of the software update, fixes and/or enhancements associated with the given software update, a version identifier of the software associated with the given software update, a category of the software associated with the given software update, a release date of the given software update, and a characterization of the importance of the given software update. For example, the importance description may identify software updates that address and/or mitigate one or more known security vulnerabilities.

In some embodiments, to determine whether a given software update is a security update, the fixes/enhancements field is processed using pattern matching and/or regular expressions. In the example of FIG. 6, the exemplary software update having a driver identifier of MKV9Y, in the BIOS category, is a security update because it contains the label "CVE" in the fixes/enhancements field. Other patterns and/or keywords may be designated to identify software updates having one or more security vulnerabilities, as would be apparent to a person of ordinary skill in the art.

FIG. 7 illustrates information maintained for an exemplary security vulnerability in an illustrative embodiment. In the example of FIG. 7, the exemplary security vulnerability corresponds to a CVE from a vulnerability database, such as the NVD database. The exemplary security vulnerability is identified by a CVE identifier (e.g., CVE-2023-53XY), and corresponds to an "out-of-bounds read vulnerability." The risk associated with the CVE comprises a disclosure of information. The base score assigned to the CVE is a score of 3.3, which has a software update security severity classification of "Low," using the exemplary software update security severity classifications described above. The maintained security vulnerability information may include a standardized description and/or categorization of software weaknesses and vulnerabilities, for example, using the common weakness enumeration (CWE) category system of such weaknesses and vulnerabilities. Publication data, such as a date of publication of a given security vulnerability, and one or more advisory links (e.g., hypertext transfer protocol links) may also be included in the information maintained for each security vulnerabilities.

FIG. 8 is a sample table 800 illustrating information maintained for available software updates in an illustrative embodiment. In the example of FIG. 8, the information maintained for a given available software update (e.g., a row in the sample table 800) comprises a driver identifier that identifies the given software update, a name (or other descriptor) of the given software update, a number of CVEs associated with the given software update, a security score of the given software update (e.g., ranging between 0.0 to 10.0 in at least some embodiments) and a software update security severity classification (e.g., assigned based on a security score of the given software update relative to the exemplary software update security severity classification thresholds described above).

Figure 9:
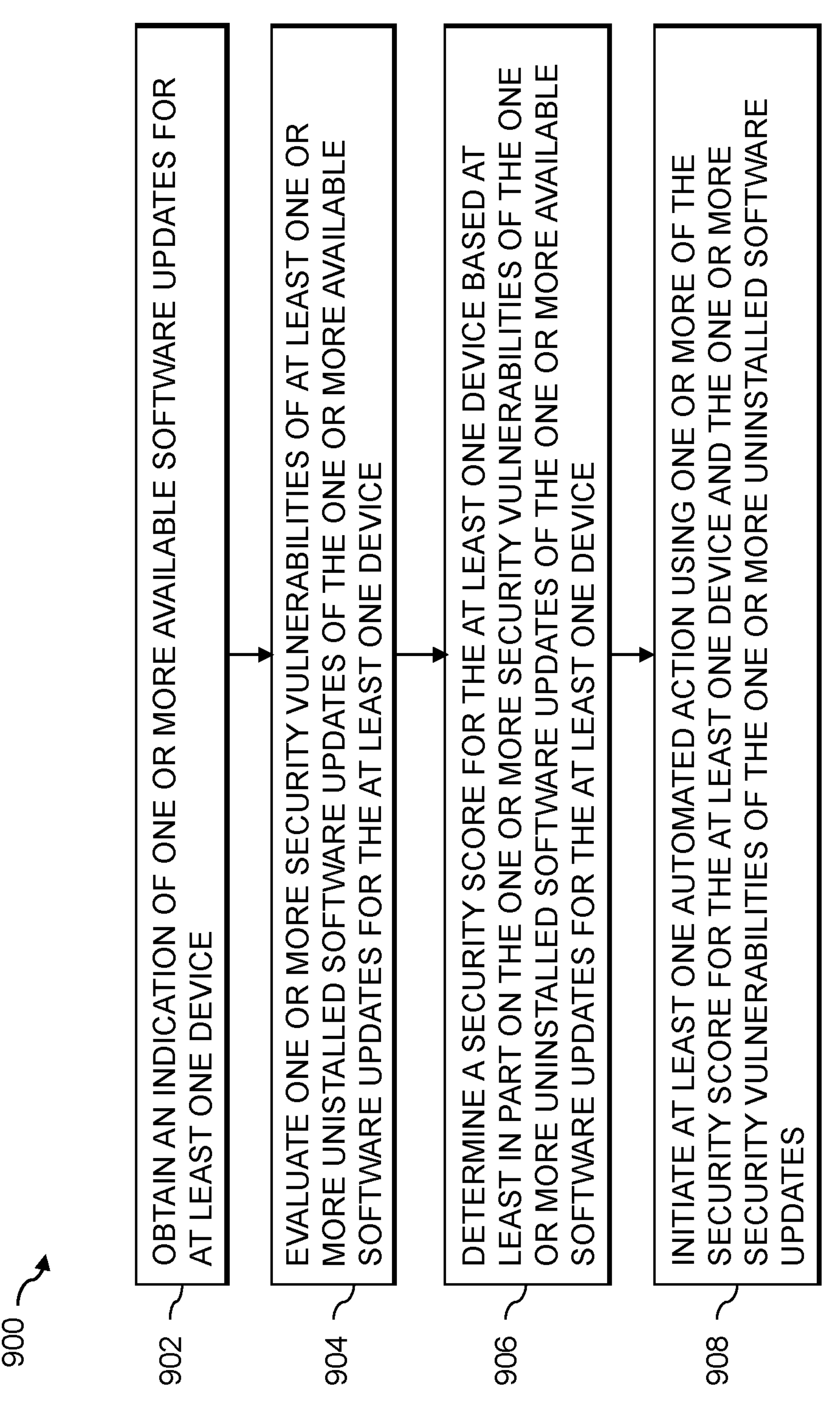
FIG. 9 is a flow chart illustrating an exemplary implementation of a process for device protection using software update security scores to mitigate software vulnerabilities in an illustrative embodiment.

FIG. 9 is a flow chart illustrating an exemplary implementation of a process 900 for device protection using software update security scores to mitigate software vulnerabilities in an illustrative embodiment. The process 900 may be performed, for example, by the software update security vulnerability mitigation module 114 of the software update management server 110 of FIG. 1. In the example of FIG. 9, the process 900 obtains, in step 902, an indication is obtained of one or more available software updates for at least one device.

One or more security vulnerabilities of at least one or more uninstalled software updates of the one or more available software updates for the at least one device are evaluated in step 904. In some embodiments, the security vulnerability of a given uninstalled software update may be equal to zero if the uninstalled software update does not have any associated CVEs.

A security score for the at least one device may be determined in step 906 based at least in part on the one or more security vulnerabilities of the one or more uninstalled software updates of the one or more available software updates for the at least one device. At least one automated action may be initiated in step 908 using one or more of the security score for the at least one device and the one or more security vulnerabilities of the one or more uninstalled software updates.

In some embodiments, the evaluating the one or more security vulnerabilities of a given one of the one or more uninstalled software updates comprises extracting the one or more security vulnerabilities from the given uninstalled software update using pattern matching; determining a respective security score for the one or more extracted security vulnerabilities; and determining an overall security score for the given uninstalled software update based at least in part on the security scores for the one or more extracted security vulnerabilities. The pattern matching may employ one or more regular expressions to extract data indicative of a security vulnerability from a description of the given uninstalled software update. The security score for a given security vulnerability may be determined by obtaining security information from a vulnerability database.

In one or more embodiments, (i) the one or more uninstalled software updates and/or (ii) the one or more available software updates may be ranked (for example, using a Top N list) using one or more respective software update security scores. The determining the security score for the at least one device may comprise determining an aggregate security score (e.g., a highest score among the one or more uninstalled software updates) of the one or more uninstalled software updates.

In one or more embodiments, the at least one automated action using the security score for the at least one device may comprise one or more of generating a notification indicating a respective security score of the at least one of the one or more uninstalled software updates; and installing the at least one of the one or more uninstalled software updates. For example, if a particular owner and/or other user of a protected hardware device authorize the software update management server 110, for example, to automatically mitigate vulnerable software (e.g., based on thresholds and/or other rules), the disclosed software update security vulnerability protection techniques can automatically install at least some of the uninstalled security updates (allowing the resulting device security score to be zero when all uninstalled security updates are installed). On the other hand, owners and/or users of protected hardware devices have the option to selectively install software updates (for example, when the associated downtime of a given protected hardware device may be more tolerable). A non-zero device security score serves as a reminder that there are still some uninstalled security updates remaining to be installed.

The particular processing operations and other network functionality described in conjunction with FIGS. 4, 5 and 8, for example, are presented by way of illustrative example only, and should not be construed as limiting the scope of the disclosure in any way. Alternative embodiments can use other types of processing operations for device protection using software update security scores to mitigate software vulnerabilities. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

In some embodiments, machine learning techniques may be employed to learn, during a training phase, a latest state for each device, and to learn (e.g., identify) new available software updates, security vulnerabilities associated with such newly available software updates; and information regarding each of the security vulnerabilities associated with such newly available software updates. For example, a given software update may be assigned a security score based on the highest security score of all the security vulnerabilities associated with the given software update (e.g., a software update without any security vulnerabilities may be assigned a security score of zero). New security scores may be computed with a regular cadence, upon the occurrence of a designated event and/or upon request.

The disclosed techniques for device protection using software update security scores to mitigate software vulnerabilities can be employed, for example, to monitor for software update security vulnerabilities by identifying software updates having security patches. A security score may be assigned for each software update based at least in part on a security severity. The security scores may be employed to prioritize the available software updates and to generate a device security score based on a security severity of the uninstalled software updates (e.g., when customers do not install all of the available software updates).

One or more embodiments of the disclosure provide improved methods, apparatus and computer program products for device protection using software update security scores to mitigate software vulnerabilities. The foregoing applications and associated embodiments should be considered as illustrative only, and numerous other embodiments can be configured using the techniques disclosed herein, in a wide variety of different applications.

It should also be understood that the disclosed software update security vulnerability protection techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for device protection using software update security scores to mitigate software vulnerabilities may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based software update security vulnerability protection engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based software update security vulnerability protection platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 10 and 11. These platforms may also be used to implement at least portions of other information processing systems in other embodiments.

Figure 10:
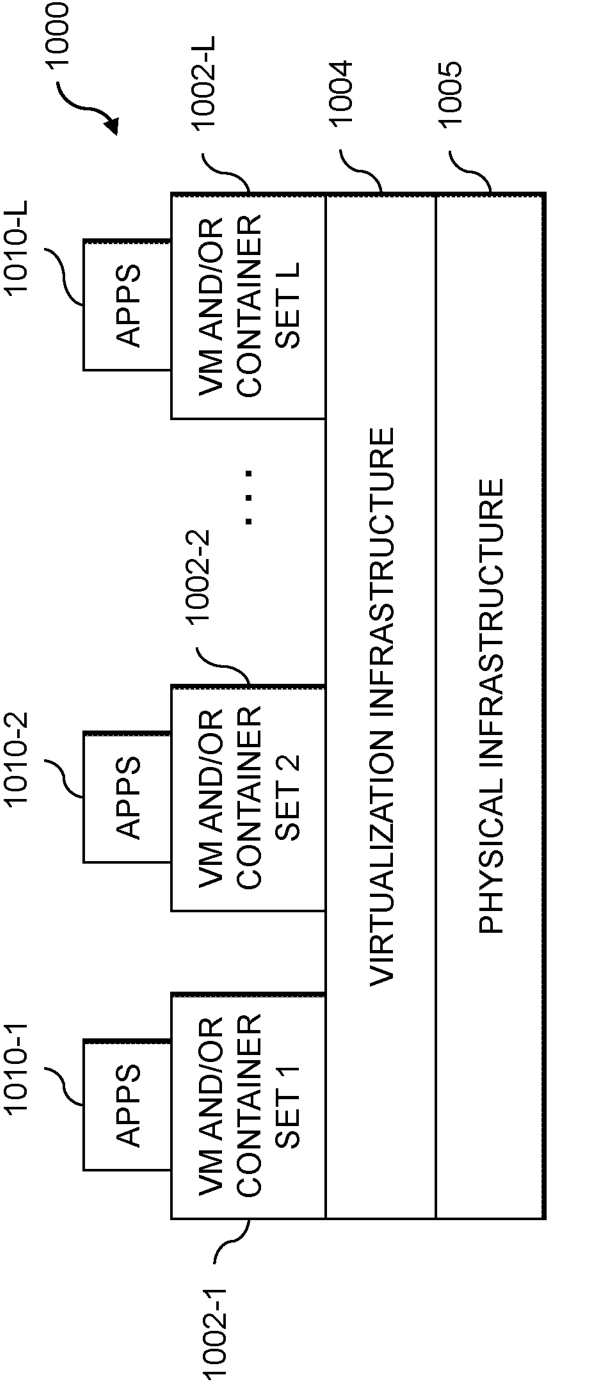
FIG. 10 illustrates an exemplary processing platform that may be used to implement at least a portion of one or more embodiments of the disclosure comprising a cloud infrastructure.

FIG. 10 shows an example processing platform comprising cloud infrastructure 1000. The cloud infrastructure 1000 comprises a combination of physical and virtual processing resources that may be utilized to implement at least a portion of the information processing system 100. The cloud infrastructure 1000 comprises multiple virtual machines (VMs) and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, . . . 1010-L running on respective ones of the VMs/container sets 1002-1, 1002-2, . . . 1002-L under the control of the virtualization infrastructure 1004. The VMs/container sets 1002 may comprise respective VMs, respective sets of one or more containers, or respective sets of one or more containers running in VMs.

In some implementations of the FIG. 10 embodiment, the VMs/container sets 1002 comprise respective VMs implemented using virtualization infrastructure 1004 that comprises at least one hypervisor. Such implementations can provide software update security vulnerability protection functionality of the type described above for one or more processes running on a given one of the VMs. For example, each of the VMs can implement software update security vulnerability protection control logic and associated mitigation functionality for one or more processes running on that particular VM.

An example of a hypervisor platform that may be used to implement a hypervisor within the virtualization infrastructure 1004 is the VMware® vSphere® which may have an associated virtual infrastructure management system such as the VMware® vCenter™. The underlying physical machines may comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system. Such implementations can provide software update security vulnerability protection and mitigation functionality of the type described above for one or more processes running on different ones of the containers. For example, a container host device supporting multiple containers of one or more container sets can implement one or more instances of software update security vulnerability protection control logic and associated mitigation functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises at least a portion of the given system and includes a plurality of processing devices, denoted 1102-1, 1102-2, 1102-3, . . . 1102-K, which communicate with one another over a network 1104. The network 1104 may comprise any type of network, such as a WAN, a LAN, a satellite network, a telephone or cable network, a cellular network, a wireless network such as WiFi or WiMAX, or various portions or combinations of these and other types of networks.

The processing device 1102-1 in the processing platform 1100 comprises a processor 1110 coupled to a memory 1112. The processor 1110 may comprise a microprocessor, a microcontroller, an ASIC, an FPGA or other type of processing circuitry, as well as portions or combinations of such circuitry elements, and the memory 1112, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and the given system may include additional or alternative processing platforms, as well as numerous distinct processing platforms in any combination, with each such platform comprising one or more computers, storage devices or other processing devices.

Figure 11:
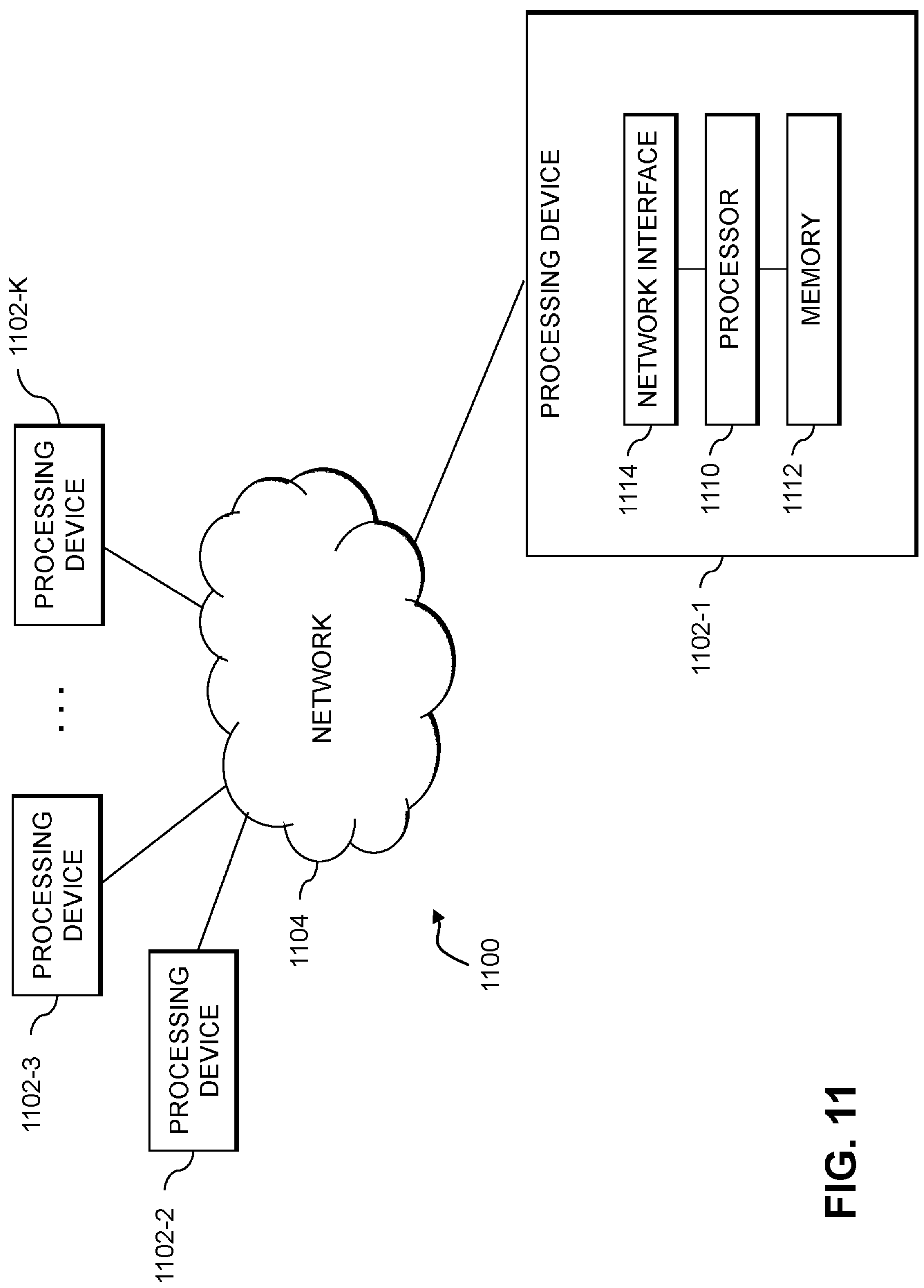
FIG. 11 illustrates another exemplary processing platform that may be used to implement at least a portion of one or more embodiments of the disclosure.

Multiple elements of an information processing system may be collectively implemented on a common processing platform of the type shown in FIG. 10 or 11, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:

obtaining an indication of one or more available software updates for at least one device;

extracting, using at least one processing device employing pattern matching, one or more security vulnerabilities, of one or more uninstalled software updates of at least one of the one or more available software updates, from a description of at least one of the one or more uninstalled software updates;

evaluating, using the at least one processing device, one or more extracted security vulnerabilities of at least one or more uninstalled software updates of the one or more available software updates for the at least one device;

determining, using the at least one processing device, an aggregate security score for the at least one device based at least in part on an aggregation of respective security scores for the one or more extracted security vulnerabilities of the one or more uninstalled software updates of the one or more available software updates for the at least one device; and initiating, using the at least one processing device, at least one automated action using one or more of the aggregate security score for the at least one device and the one or more extracted security vulnerabilities of the one or more uninstalled software updates;

wherein the at least one processing device comprises a processor coupled to a memory.

2. The method of claim 1, wherein the evaluating the one or more extracted security vulnerabilities of a given one of the one or more uninstalled software updates comprises determining the respective security scores for the one or more extracted security vulnerabilities; and determining an overall security score for the given uninstalled software update based at least in part on the security scores for the one or more extracted security vulnerabilities.

3. The method of claim 2, wherein the pattern matching employs one or more regular expressions to extract data indicative of a security vulnerability from the description of the given uninstalled software update.

4. The method of claim 2, wherein the security score for a given one of the one or more extracted security vulnerabilities is determined by obtaining security information from a vulnerability database.

5. The method of claim 1, further comprising ranking the at least one of (i) the one or more uninstalled software updates and (ii) the one or more available software updates using one or more respective software update security scores.

6. The method of claim 1, wherein the one or more available software updates comprise an update of one or more of: a basic input/output system; a device driver; firmware; and a software application.

7. The method of claim 1, wherein the at least one automated action using the aggregate security score for the at least one device comprises one or more of generating a notification indicating a respective security score of at least one of the one or more uninstalled software updates; and installing at least one of the one or more uninstalled software updates.

8. The method of claim 1, wherein the aggregation comprises one or more of an average and a mean of the respective security scores for the one or more security vulnerabilities of the one or more uninstalled software updates.

9. The method of claim 1, wherein a given one of the one or more uninstalled software updates has a plurality of corresponding extracted security vulnerabilities, and wherein the respective security score for a given extracted security vulnerability of the given uninstalled software update is selected as the respective security score for the given uninstalled software update based at least in part on an evaluation of the respective security scores for the plurality of corresponding extracted security vulnerabilities of the given uninstalled software update.

10. An apparatus comprising:

at least one processing device comprising a processor coupled to a memory;

the at least one processing device being configured to implement the following steps:

obtaining an indication of one or more available software updates for at least one device;

extracting, using at least one processing device employing pattern matching, one or more security vulnerabilities, of one or more uninstalled software updates of at least one of the one or more available software updates, from a description of at least one of the one or more uninstalled software updates;

evaluating, using the at least one processing device, one or more extracted security vulnerabilities of at least one or more uninstalled software updates of the one or more available software updates for the at least one device;

determining, using the at least one processing device, an aggregate security score for the at least one device based at least in part on an aggregation of respective security scores for the one or more extracted security vulnerabilities of the one or more uninstalled software updates of the one or more available software updates for the at least one device; and initiating, using the at least one processing device, at least one automated action using one or more of the aggregate security score for the at least one device and the one or more extracted security vulnerabilities of the one or more uninstalled software updates.

11. The apparatus of claim 10, wherein the evaluating the one or more extracted security vulnerabilities of a given one of the one or more uninstalled software updates comprises determining the respective security scores for the one or more extracted security vulnerabilities; and determining an overall security score for the given uninstalled software update based at least in part on the security scores for the one or more extracted security vulnerabilities.

12. The apparatus of claim 11, wherein the security score for a given one of the one or more extracted security vulnerabilities is determined by obtaining security information from a vulnerability database.

13. The apparatus of claim 10, further comprising ranking the at least one of (i) the one or more uninstalled software updates and (ii) the one or more available software updates using one or more respective software update security scores.

14. The apparatus of claim 10, wherein the at least one automated action using the aggregate security score for the at least one device comprises one or more of generating a notification indicating a respective security score of at least one of the one or more uninstalled software updates; and installing at least one of the one or more uninstalled software updates.

15. A non-transitory processor-readable storage medium having stored therein program code of one or more software programs, wherein the program code when executed by at least one processing device causes the at least one processing device to perform the following steps:

obtaining an indication of one or more available software updates for at least one device;

extracting, using at least one processing device employing pattern matching, one or more security vulnerabilities, of one or more uninstalled software updates of at least one of the one or more available software updates, from a description of at least one of the one or more uninstalled software updates;

evaluating, using the at least one processing device, one or more extracted security vulnerabilities of at least one or more uninstalled software updates of the one or more available software updates for the at least one device;

determining, using the at least one processing device, an aggregate security score for the at least one device based at least in part on an aggregation of respective security scores for the one or more extracted security vulnerabilities of the one or more uninstalled software updates of the one or more available software updates for the at least one device; and initiating, using the at least one processing device, at least one automated action using one or more of the aggregate security score for the at least one device and the one or more extracted security vulnerabilities of the one or more uninstalled software updates.

16. The non-transitory processor-readable storage medium of claim 15, wherein the evaluating the one or more extracted security vulnerabilities of a given one of the one or more uninstalled software updates comprises determining the respective security scores for the one or more extracted security vulnerabilities; and determining an overall security score for the given uninstalled software update based at least in part on the security scores for the one or more extracted security vulnerabilities.

17. The non-transitory processor-readable storage medium of claim 16, wherein the security score for a given one of the one or more extracted security vulnerabilities is determined by obtaining security information from a vulnerability database.

18. The non-transitory processor-readable storage medium of claim 16, wherein the pattern matching employs one or more regular expressions to extract data indicative of a security vulnerability from the description of the given uninstalled software update.

19. The non-transitory processor-readable storage medium of claim 15, further comprising ranking the at least one of (i) the one or more uninstalled software updates and (ii) the one or more available software updates using one or more respective software update security scores.

20. The non-transitory processor-readable storage medium of claim 15, wherein the at least one automated action using the aggregate security score for the at least one device comprises one or more of generating a notification indicating a respective security score of at least one of the one or more uninstalled software updates; and installing at least one of the one or more uninstalled software updates.

* * * * *